United States Patent Office 2,716,636
Patented Aug. 30, 1955

2,716,636

VULCANIZATION OF RUBBER

Arnold R. Davis, Riverside, Conn., assignor to American Cyanamid Company, New York, N. Y., a corporation of Maine No Drawing. Application December 23, 1952, Serial No. 327,674

16 Claims. (Cl. 260—3)

This invention relates to a new vulcanization process adapted for use in both synthetic and natural rubber. More particularly, it relates to vulcanization of synthetic and natural rubber, making use of a new type of accelerator which constitutes a reaction product of formaldehyde, a mercaptan and an addition product of a diarylguanidine and a zinc salt of a mercaptan or a dithiocarbamic acid. The present invention relates to rubber compositions containing the accelerators and to the process of vulcanizing therewith. The series of products which constitute the accelerators forms the subject matter of my copending application for United States Letters Patent Serial No. 327,673 filed of even date.

The accelerators used according to the present invention are reaction products of formaldehyde, mercaptobenzothiazole or mercaptothiazoline and a diarylguanidine addition product which may be designated by the formula $A_xZn(B)_2$. "A" represents such diarylguanidines as diphenyl, ditolyl, dixylyl, dinaphthyl and the like. "x," in the above formula, represents the integers one and two. "B" represents both mercaptans and dithiocarbamic acids. Included in this group are such compounds as the zinc salts of mercaptobenzothiazole; the dialkyl dithiocarbamic acids such as the dimethyl, diethyl, dibutyl and bis-alkoxyalkyl; the alkylaryl dithiocarbamic acids such as the N,N-propylphenyl, N,N-butyl-phenyl, and the like.

The accelerators of the present invention are useful with natural rubber and with synthetic rubbers such, for instance, as Butyl rubber (a copolymer of olefine with a small amount of diolefine), and polymers of the butadiene-styrene and butadiene-acrylic type. The accelerators may be used alone or in combination with other accelerators, activators, retarders and the like. They may be used in conjunction with known types of rubber compositions which may and ordinarily will contain such materials as sulfur, stearic acid, fillers, surfacing agents and the like. These are conventional and form no part of this invention.

The proportions in which the diarylguanidine addition product and the formaldehyde and the mercaptan are combined may be quite widely varied. In general, however, it has been found preferable to use one mol part of the diarylguanidine addition product, one to six mol parts of formaldehyde and one to six mol parts of mercaptan. The products may be readily produced by heating the reactants to the fusion point and continuing heating until reaction is complete.

The following examples will more fully illustrate the invention. All parts are by weight unless otherwise noted. The following abbreviations will be used in these examples:

DPG—diphenyl guanidine
DOTG—di-o-tolyl guandine
DXG—dixylyl guanidine
MBT—mercaptobenzothiazole
MT—mercaptothiazoline Example 1

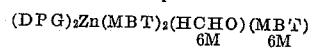

105.5 parts of diphenylguanidine and 99.5 parts of zinc salt of mercaptobenzothiazole were heated together until they fused at 110° C. The addition product was cooled to about 95° C. and a mixture comprising 45 parts of paraformaldehyde and 250 parts of mercaptobenzothiazole added. After heating at 100–105° C. for 45 minutes, a clear liquid resulted which gave a clear resin on cooling.

Example 2

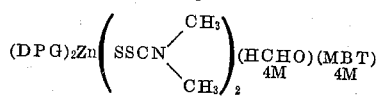

76.4 parts of zinc dimethyl dithiocarbamate and 105.5 parts of diphenylguanidine were fused together at 130–135° C. A clear resin resulted on cooling which was crushed and had added to it 30 parts of paraformaldehyde and 167 parts of mercaptobenzothiazole. The resulting mixture was fused and held at 90–100° C. for 30 minutes. A clear brownish colored resin resulted on cooling.

Example 3

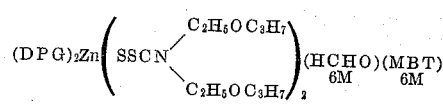

296.5 parts of the zinc salt of bis-ethoxypropyl dithiocarbamic acid and 211 parts of diphenylguanidine were fused at 100° C. The resulting clear liquid on cooling gave a light colored paste. 254 parts of the paste was fused together with 45 parts of paraformaldehyde and 250.5 parts of mercaptobenzothiazole at 95° C.–105° C. A clear liquid formed which on cooling gave a clear resin.

Example 4

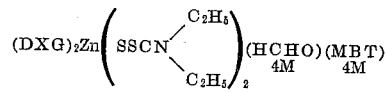

112 parts of the product obtained by heating 107 parts of dixylylguanidine and 73 parts of zinc diethyl dithiocarbamate at 100–105° C. for about a half hour is mixed with 15 parts of paraformaldehyde and 84 parts of mercaptobenzothiazole. After heating resultant mixture at 106–110° C. for about 20 minutes a clear resin is obtained on cooling.

Example 5

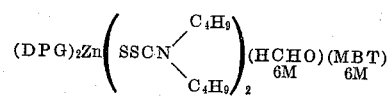

119 parts of zinc dibutyl dithiocarbamate and 105.5 parts of diphenylguanidine were fused together at 100° C. for 30 minutes. 112 parts of the resultant product were fused with 22.5 parts of paraformaldehyde and 125 parts of mercaptobenzothiazole at 100° C. On cooling a brownish resin resulted.

Example 6

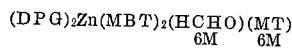

102.5 parts of the addition product $(DPG)_2Zn(MBT)_2$ were fused with 22.5 parts of paraformaldehyde and 89 parts of mercaptothiazoline at 105° C. for 45 minutes. On cooling a clear resin was formed.

Example 7

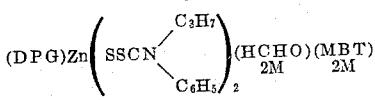

695 parts of the addition product, obtained by fusing 485 parts of zinc propylphenyl dithiocarbamate and 211 parts of diphenylguanidine at 95–100° C. for 15 minutes, were fused with 65 parts of paraformaldehyde and 334 parts of mercaptobenzothiazole at 80–90° C. On cooling a clear yellowish resin was obtained.

Example 8

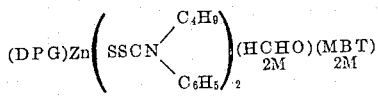

513 parts of zinc butylphenyl dithiocarbamate and 211 parts of diphenylguanidine were fused together for 15 minutes at 95° C. To 724 parts of the resultant product were added 65 parts of paraformaldehyde and 334 parts of mercaptobenzothiazole. The mixture was heated at 85–90° C. for 40 minutes. On cooling a clear yellowish resin resulted.

Example 9

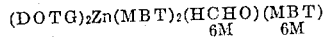

119 parts of zinc salt of mercaptobenzothiazole and 143 parts of di-o-tolyl guanidine is fused at 125° C., cooled, ground and is heated again at 125° C. for 15 minutes. After standing overnight, 110 parts of the fusion product is heated with 23 parts of paraformaldehyde and 125 parts of mercaptobenzothiazole at 100°–105° C. for 45 minutes. A clear liquid results which gives a clear resin on cooling.

Example 10

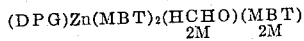

The procedure of Example 1 was repeated, using 105.5 parts of diphenylguanidine and 199 parts of zinc salt of mercaptobenzothiazole. 122 parts of the resultant product were fused with 12 parts of paraformaldehyde and 67 parts of mercaptobenzothiazole at 105°–110° C. Cooling gave a light brownish yellow resin.

Example 11

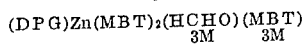

The procedure of Example 8 is repeated, using 91 parts of the fushion product of diphenylguanidine and zinc salt of mercaptobenzothiazole, 13.5 parts of paraformaldehyde and 75 parts of mercaptobenzothiozole. The mixture was heated at 110° C. for 40 minutes. On cooling a light brownish colored resin was formed.

Example 12

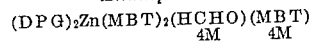

The procedure of Example 1 was repeated, using 30 parts of formaldehyde and 167 parts of mercaptobenzothiazole. The mixture was held at 125–130° C. for 25 minutes. Cooling gave a clear amber colored resin.

Example 13

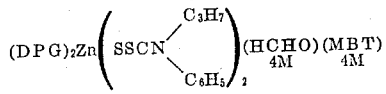

The procedure of Example 6 was repeated, using 485 parts of zinc propylphenyl dithiocarbamate and 422 parts of diphenylguanidine. To the resultant product was added 120 parts of paraformaldehyde and 669 parts of mercaptobenzothiazole. The mixture was held at 105–110° C. for 20 minutes. A clear amber colored resin appeared on cooling.

Example 14

The accelerator produced in Example 11 was made into the following composition:

| | |
|---|---:|
| GR–S | 100 |
| E. P. C. Black | 50 |
| Zinc oxide | 5 |
| Sulfur | 3 |
| Bardol | 5 |
| Accelerator | 0.75 |

After curing for 60 minutes at 141° C. the product was found to have a Shore hardness of 62.

Example 15

The following compositions were prepared and the results shown below obtained:

| | Compounds | | | | | |
|---|---|---|---|---|---|---|
| | A | B | C | D | E | F |
| GR-S (a copolymer of butadiene and styrene) | 100 | 100 | 100 | 100 | 100 | 100 |
| Bardol (Coal Tar Softener) | 5 | 5 | 5 | 5 | 5 | 5 |
| E. P. C. Black | 50 | 50 | 50 | 50 | 50 | 50 |
| Zinc Oxide | 5 | 5 | 5 | 5 | 5 | 5 |
| Sulfur | 2 | 2 | 2 | 2 | 2 | 2 |
| (DPG)₂Zn(MBT)₂(HCHO)(MBT)(Ex. 1) 6M 6M | 1.15 | | | | | |
| (DPG)₂Zn(MBT)₂(HCHO)(MBT)(Ex. 1) 6M 6M | | 1.0 | | | | |
| (DPG)₂Zn(MBT)₂(HCHO)(MBT)(Ex. 12) 4M 4M | | | 1.05 | | | |
| (DPG)₂Zn(SSCN(C₃H₇)(C₆H₅))₂(HCHO)(MBT)(Ex. 13) 4M 4M | | | | 0.70 | | |
| (DPG)₂Zn(SSCN(C₃H₇)(C₆H₅))₂(HCHO)(MBT)(Ex. 13) 4M 4M | | | | | 0.90 | |
| (DPG)₂Zn(MBT)₂(HCHO)(MT)(Ex. 6) 6M 6M | | | | | | 1.0 |
| 60′ cure at 141° C. | | | | | | |
| Shore Hardness (30″) | 60 | 61 | 60 | 55 | 58 | 60 |
| Modulus at 300% | 1,265 | 1,200 | 1,220 | 905 | 1,125 | 1,010 |
| Tensile | 2,290 | 2,770 | 2,665 | 2,740 | 2,885 | 2,875 |
| Elongation | 440 | 515 | 500 | 625 | 535 | 610 |

I claim:
1. A composition obtained by milling together an unvulcanized vulcanizable rubber and an accelerator which is a reaction product of 1–6 mols of formaldehyde, 1–6 mols of a member selected from the group consisting of mercaptobenzothiazole and mercaptothiazoline, and one mol of an addition product which may be represented by the formula $A_xZn(B)_2$ in which "A" represents a diarylguanidine, "$x$" represents the integers one and two, and "B" represents a radical selected from the group consisting of

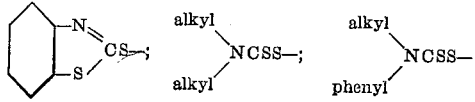
and
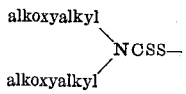

2. A composition as in claim 1 in which the accelerator is a reaction product of 1–6 mols of formaldehyde, 1–6 mols of mercaptobenzothiazole and one mol of an addition product of a diarylguanidine and zinc salt of mercaptobenzothiazole.

3. A composition as in claim 2 in which the diarylguanidine is diphenylguanidine.

4. A composition as in claim 2 in which the diarylguanidine is di-o-tolylguanidine.

5. A composition as in claim 2 in which the diarylguanidine is dixylylguanidine.

6. A composition as in claim 2 in which the accelerator is a reaction product of 1–6 mols of formaldehyde, 1–6 mols of mercaptobenzothiazole and one mol of an addition product of a diarylguanidine and zinc salt of a diaryl dithiocarbamic acid.

7. A composition as in claim 2 in which the accelerator is a reaction product of 1–6 mols of formaldehyde, 1–6 mols of mercaptobenzothiazole and one mol of an addition product of a diarylguanidine and the zinc salt of a dialkoxyalkyl dithiocarbamic acid.

8. A composition as in claim 2 in which the accelerator is a reaction product of 1–6 mols of formaldehyde, 1–6 mols of mercaptobenzothiazole and one mol of an addition product of a diarylguanidine and the zinc salt of an alkylphenyl dithiocarbamic acid.

9. A process of vulcanizing natural and synthetic rubbers which comprises the steps of milling together a mixture comprising an unvulcanized vulcanizable rubber composition and an accelerator which is a reaction product of 1–6 mols of formaldehyde, 1–6 mols of a member selected from the group consisting of mercaptobenzothiazole and mercaptothiazoline, and one mol of an addition product which may be represented by the formula $A_xZn(B)_2$ in which "A" reprsents a diarylguanidine, "$x$" represents the integers one and two, and "B" represents a radical selected from the group consisting of

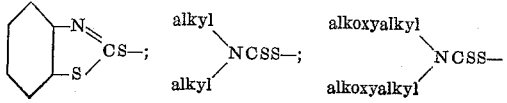
and
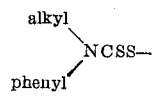

and subjecting the mixture to heat for a sufficient length of time to establish the cure of the rubber.

10. A process according to claim 9 in which the accelerator is a reaction product of 1–6 mols of formaldehyde, 1–6 mols of mercaptobenzothiazole, and one mol of a diarylguanidine addition product of zinc salt of mercaptobenzothiazole.

11. A process according to claim 10 in which the diarylguanidine is diphenylguanidine.

12. A process according to claim 10 in which the diarylguanidine is di-o-tolylguanidine.

13. A process according to claim 10 in which the diarylguanidine is dixylylguanidine.

14. A process according to claim 9 in which the accelerator is a reaction product of 1–6 mols of formaldehyde, 1–6 mols of mercaptobenzothiazole and one mol of an addition product of diphenylguanidine and the zinc salt of a dialkyl dithiocarbamic acid.

15. A process according to claim 9 in which the accelerator is a reaction product of 1–6 mols of formaldehyde, 1–6 mols of mercaptobenzothiazole and one mol of an addition product of diphenylguanidine and the zinc salt of a dialkoxyalkyl dithiocarbamic acid.

16. A process according to claim 9 in which the accelerator is a reaction product of 1–6 mols of formaldehyde, 1–6 mols of mercaptobenzothiazole and one mol of an addition product of diphenylguanidine and the zinc salt of an alkylphenyl dithiocarbamic acid.

References Cited in the file of this patent

UNITED STATES PATENTS

| | | |
|---|---|---|
| 2,397,409 | Davis | Mar. 26, 1946 |
| 2,412,801 | Davis | Dec. 17, 1946 |